(12) United States Patent
Kasar et al.

(10) Patent No.: US 9,891,719 B2
(45) Date of Patent: *Feb. 13, 2018

(54) IMPACT AND CONTACTLESS GESTURE INPUTS FOR ELECTRONIC DEVICES

(71) Applicant: APPLE INC., Cupertino, CA (US)

(72) Inventors: Darshan R. Kasar, San Francisco, CA (US); Greg Nayman, San Francisco, CA (US); Robert Doran Watson, Santa Clara, CA (US); James L. McPeak, Fremont, CA (US); Edwin Foo, Sunnyvale, CA (US); Albert Golko, Saratoga, CA (US); Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,727

(22) Filed: Jan. 6, 2017

(65) Prior Publication Data

US 2017/0115743 A1   Apr. 27, 2017

Related U.S. Application Data

(63) Continuation of application No. 14/257,869, filed on Apr. 21, 2014, now Pat. No. 9,575,508.

(51) Int. Cl.
*G06F 1/16*      (2006.01)
*G06F 3/01*      (2006.01)
*G06F 3/0346*    (2013.01)

(52) U.S. Cl.
CPC ............ *G06F 3/017* (2013.01); *G06F 1/1632* (2013.01); *G06F 3/0346* (2013.01); *G06F 2200/1636* (2013.01)

(58) Field of Classification Search
CPC ...... G06F 1/1632; G06F 3/017; G06F 3/0346; G06F 1/1694; G06F 2200/1636
See application file for complete search history.

(56) References Cited

U.S. PATENT DOCUMENTS

| | | |
|---|---|---|
| 7,519,223 B2 | 4/2009 | Dehlin et al. |
| 8,312,479 B2 | 11/2012 | Boillot |
| 8,351,979 B2 | 1/2013 | Seguin et al. |
| 8,743,089 B2 | 6/2014 | Sato et al. |
| 8,811,719 B2 | 8/2014 | Wilson et al. |
| 2006/0210958 A1 | 9/2006 | Rimas-Ribikauskas et al. |
| 2007/0130547 A1 | 6/2007 | Boillot |

(Continued)

OTHER PUBLICATIONS

Non-Final Office Action dated Jul. 30, 2015 in U.S. Appl. No. 14/257,869, in 24 pages.

(Continued)

*Primary Examiner* — Hong Zhou
(74) *Attorney, Agent, or Firm* — Kilpatrick Townsend & Stockton LLP

(57) ABSTRACT

A docking station configured to mate to an electronic device enables methods of interacting with the electronic device by impacting (e.g., knocking) on a table on which the device and/or the docking station are disposed and by means of contactless gestures. The electronic device may remain in a powered off state while the docking station continuously monitors for user input. The docking station may have a processor that is capable of detecting a user's impact and contactless gesture inputs.

16 Claims, 6 Drawing Sheets

(56) References Cited

U.S. PATENT DOCUMENTS

| | | |
|---|---|---|
| 2008/0100572 A1 | 5/2008 | Boillot |
| 2009/0085865 A1 | 4/2009 | Fattah |
| 2009/0281888 A1 | 11/2009 | Zai et al. |
| 2009/0284463 A1 | 11/2009 | Morimoto et al. |
| 2010/0283624 A1 | 11/2010 | Krueger |
| 2011/0053641 A1* | 3/2011 | Lee .................... G06F 1/1626 455/556.1 |
| 2011/0109540 A1 | 5/2011 | Milne et al. |
| 2011/0125929 A1 | 5/2011 | James et al. |
| 2012/0113241 A1 | 5/2012 | Sundaresan et al. |
| 2012/0129511 A1* | 5/2012 | Hsu .................... H04M 1/66 455/418 |
| 2012/0185203 A1 | 7/2012 | Tanaka |
| 2012/0242584 A1 | 9/2012 | Tuli |
| 2012/0249587 A1 | 10/2012 | Anderson et al. |
| 2012/0257035 A1 | 10/2012 | Larsen |
| 2012/0278712 A1 | 11/2012 | Wright et al. |
| 2013/0162527 A1 | 6/2013 | Dahl |
| 2014/0111415 A1* | 4/2014 | Gargi .................... G06F 3/017 345/156 |
| 2014/0152537 A1* | 6/2014 | Abdelsamie ............ G06F 3/017 345/156 |
| 2014/0184495 A1 | 7/2014 | Quin |
| 2014/0191963 A1 | 7/2014 | Murakoshi et al. |
| 2014/0380249 A1 | 12/2014 | Fleizach |
| 2015/0130743 A1 | 5/2015 | Li |
| 2015/0195474 A1 | 7/2015 | Lu |

OTHER PUBLICATIONS

Final Office Action dated Dec. 30, 2015 in U.S. Appl. No. 14/257,869, in 27 pages.

Non-Final Office Action dated Jun. 1, 2016 in U.S. Appl. No. 14/257,869, in 26 pages.

Notice of Allowance dated Oct. 21, 2016 in U.S. Appl. No. 14/257,869, in 5 pages.

* cited by examiner

IMPACT AND CONTACTLESS GESTURE INPUTS FOR ELECTRONIC DEVICES

CROSS-REFERENCES TO OTHER APPLICATIONS

This application claims priority to U.S. provisional patent application Ser. No. 14/257,869, for "IMPACT AND CONTACTLESS GESTURE INPUTS FOR DOCKING STATIONS" filed on Apr. 21, 2014 which is hereby incorporated by reference in entirety for all purposes.

FIELD

The present invention relates generally to docking stations and in particular to docking stations for use with portable electronic devices such as media players.

BACKGROUND

Docking stations are used for a wide variety of electronic devices, facilitating the supply of electrical power to the electronic device and providing other features such as a sound system, a radio and/or data communication with another electronic device.

As portable media players, smart-phones, tablets and other electronic devices become more popular, they have become a more integral part of everyday life for the user. The increased utilization and dependence on such devices by users results in a high level of daily interaction with the device. Thus, electronic devices having intuitive methods of commanding the device will be of benefit to the user, simplifying their interaction with the device and making the process more seamless.

New docking stations may require new features to enable a user to simplify their interaction with electronic devices.

SUMMARY

Embodiments of the invention pertain to methods and a docking system useful for interacting with an electronic device where the user does not have to be within the field of view of the device and/or the device does not have to be powered on for the user to interact with it.

Some embodiments of the present invention relate to an intuitive method of interacting with an electronic device where a user knocks or taps on a surface on which the device and/or its docking station are disposed. Other embodiments of the present invention disclose an apparatus that employs contactless gesture sensors within the docking station and/or the electronic device to continuously monitor for contactless user input.

One particular embodiment employs an accelerometer within the docking station configured to sense vibration of a surface on which the docking station and electronic device are disposed. In further embodiments, the docking station may also contain a processor configured to notify the electronic device when a user commands the electronic device by impacting the surface. In some embodiments a user may impact (e.g., a knock, tap, etc.) on the surface once for one command, twice for another command and three times for yet another command. In other embodiments the docking station may be powered by an independent power supply.

In further embodiments, a training and/or calibration mode may be used to aid the docking station in distinguishing a user command (knock) from other impacts on the surface. For example, in one embodiment a user may mate the electronic device with the docking station and set them on the surface that the user intends to interact with. A user may then activate a training mode on the electronic device and program certain impact events into the device. These impact events may be analyzed by the electronic device such that it only responds when an impact event having similar parameters is detected.

Other embodiments may incorporate one or more contactless gesture sensors in the docking station and/or the electronic device such that a user may command the electronic device in a contactless manner. In one embodiment, the electronic device may notify the docking station of a particular operating state of the electronic device. The docking station may detect an attribute value one or more contactless gestures using the contactless gesture sensors. A message may be transmitted by the docking station to the electronic device based on the operating state of the electronic device and the attribute value of the contactless gesture. The electronic device may then perform an action based on the message.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Many electronic devices such as smart-phones, media players, and tablet computers have docking stations that facilitate charging the device's battery and/or provide other features such as a sound system, peripheral video, or data communications. In some applications it may be beneficial for the docking station to offer the user methods of interacting with the electronic device where the user may knock on a surface or where the user employs one or more contactless gestures. More specifically, in some applications an intuitive method of interacting with the device may be to knock or tap on a table on which the device and the docking station are disposed. In other applications, it may be beneficial to power off the device and employ sensors within the docking station, powered with a separate power supply, to continuously monitor for contactless user input such that the electronic device only wakes when the user interacts with it. Other associated methods, applications, features and benefits of embodiments will be described herein.

Figure 1:
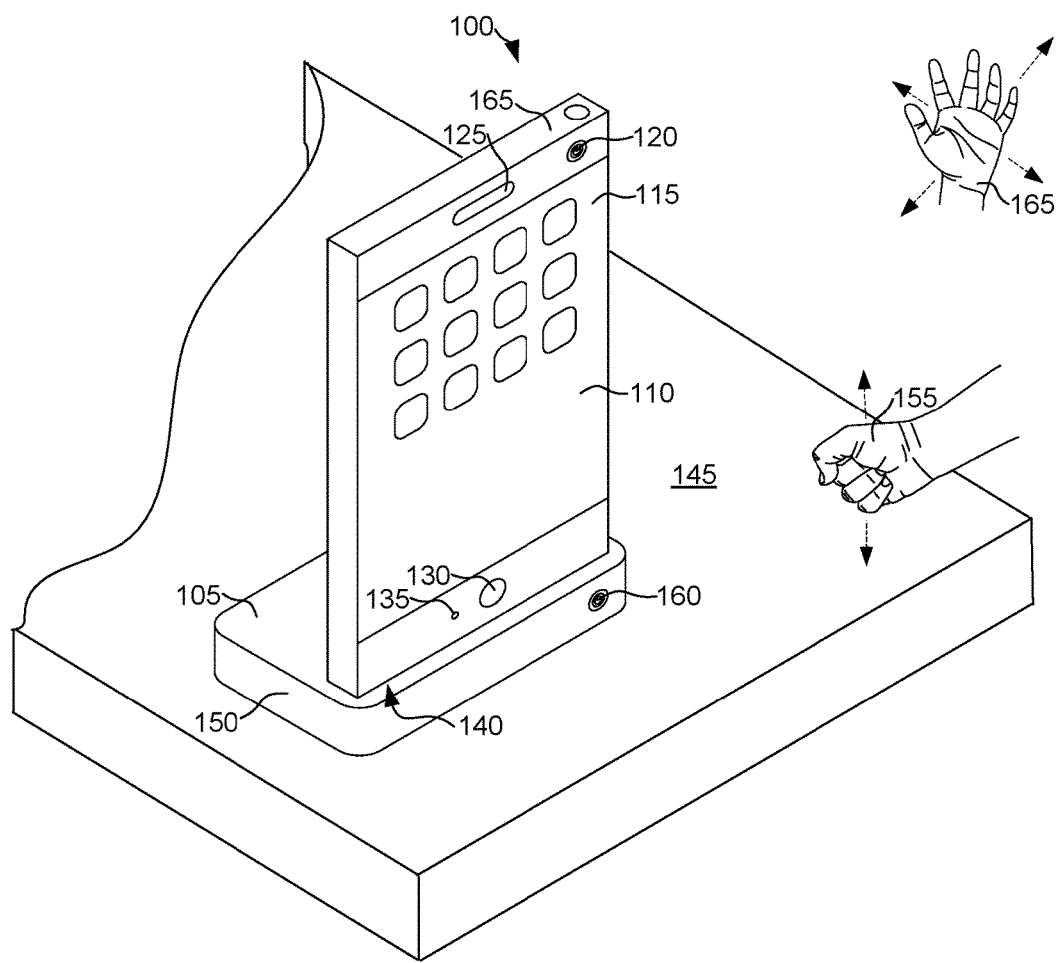
FIG. 1 is a front perspective view of an electronic device mated to a docking station according to one embodiment of the invention.

FIG. 1 depicts a simplified diagram of example electronic device 100 that may be mated to docking station 105. Electronic device 100 includes a front face 110 having a display screen 115, a sensor 120, a speaker 125, a home button 130 and a microphone 135. Bottom face 140 may electrically interface with docking station 105, as will be discussed in more detail below. Although the embodiment illustrated in FIG. 1 shows one particular configuration of electronic device 100, it is understood that myriad configurations of electronic devices may be used. For example, electronic devices may include, but shall not be limited to: phones, tablet computers, laptop computers, wristwatch computers, portable media players, and other portable electronic systems.

In one embodiment a user may prefer to interact with electronic device 100 with an impact event rather than an alternative manner such as depressing home button 130 or touching display screen 115. As an illustration, electronic device 100 and docking station 105 may be placed on surface 145 that may be, for example, a desk or a table. Docking station 105 may be equipped with one or more sensors capable of detecting vibration of surface 145. In some embodiments electronic device 100 may be ready to receive user input such as when an alarm activates or a phone call is received. Electronic device may then, based upon such activation events, receive input through one or more vibration sensors in docking station 105. The input may be from a user who impacts surface 145, for example with a knocking action, as illustrated by hand 155. In other embodiments electronic device 100 may be configured to receive impact inputs through docking station 105 at any time without the requirement of a prior activation event. In yet further embodiments, electronic device 100 may be configured to distinguish between different impact inputs such as knocking on the table once for one command, twice for another command and three times for yet another command. These embodiments and others will be described in greater detail below.

In some embodiments, dock 105 may be equipped with one or more vibration sensors to detect impact inputs from a user. A vibration sensor may sense acceleration in one, two or three or more directions. For example, in one embodiment the vibration sensor may be a tri-axial accelerometer, able to sense acceleration in three distinct axes. In other embodiments other types of sensors may be used such as cantilevered masses, strain gauges, laser interferometers and the like. The vibration sensor may be coupled to a processing system (described in detail below as a processor or as vibration analysis circuitry, see FIG. 6) that analyzes an output of a vibration sensor and determines whether or not the impact input meets certain criteria, qualifying the impact event as a user input. In some embodiments the vibration sensor and processing system may be within dock 105, while in other embodiments they may be in portable electronic device 100. In further embodiments, the vibration sensor may be in dock 105 while the processing system is in portable electronic device 100 and vise versa.

Figure 2:
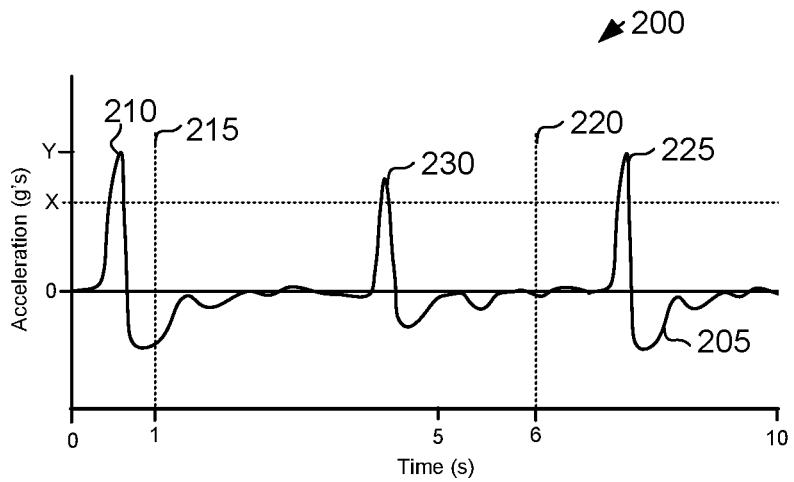
FIG. 2 is an example accelerometer sensor signal.

FIG. 2 depicts an example accelerometer output signal 200 to illustrate one embodiment of the invention. An accelerometer waveform 205 is shown progressing left to right from a time of 0 seconds to a time of 10 seconds. A vertical axis represents the gravitational force (g-forces) experienced by the accelerometer that are sent to the processing system. Peaks in the g-force may represent impact events from a user or may also represent non-desirable user impact events such as someone setting a glass of water on surface 145 (see FIG. 1). In some embodiments it may be beneficial to distinguish desirable user impact events from non-desirable impact events. FIG. 2 further shows that the baseline acceleration is 0 g's, a threshold acceleration is set at X g's and the scale has a maximum of Y g's. The time scale, waveforms and the g-force values of FIG. 2 are purely for illustrative purposes and the actual parameters may be different in other embodiments.

In a first embodiment, the processing system may not require an activation event (e.g., a calendar alarm or an incoming phone call) to detect a desirable user impact input. In this embodiment the processing system may simply look for an acceleration greater than the threshold value of X g's to discern a desirable user impact from a non-desirable user impact. Now referring to FIG. 2, at a time of approximately 0.5 seconds a first acceleration peak 210 is recorded at a value of Y g's which is greater than the threshold of X g's. Since Y g's is greater than the threshold value of X g's, first acceleration peak 210 qualifies as a desirable user input. Based upon the detected user input, dock 105 may transmit an activation signal to electronic device 210 commanding it to perform a function such as silencing an alarm, answering an incoming phone call, opening a calendar application, opening a music player, initiating the play of music or a video, etc. The particular function performed by electronic device 100 upon the user input may be customized by the user. In some embodiments, particularly when no prerequisite activation event is required, it may be beneficial to employ a user impact command such as two sequential impact inputs within a particular time window. This may minimize false identification of a user impact command as compared to a single impact command. Embodiments pertaining to multiple impact events along with other methods that may minimize false identification are discussed below.

Figure 3:
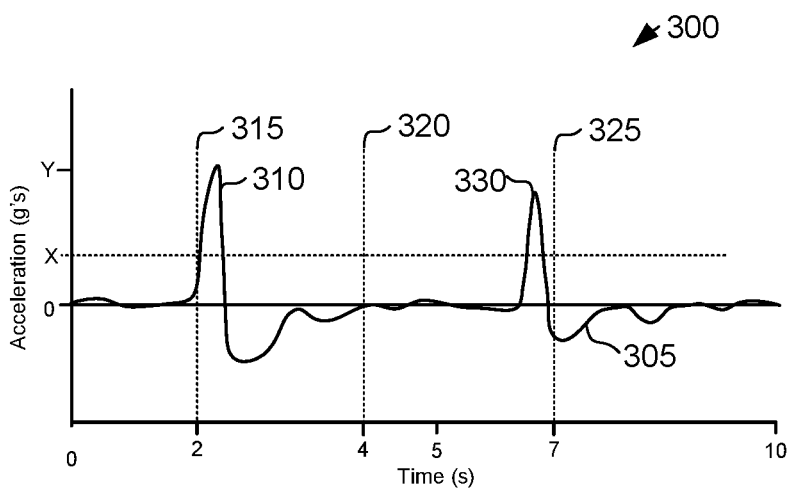
FIG. 3 is an example accelerometer sensor signal.

In further embodiments, an activation event such as a wake up alarm, a calendar alarm, an incoming phone call, an incoming text or other event may be used in conjunction with an impact input to enable a user to interact with electronic device 100. More specifically, upon the occurrence of a particular activation event, the vibration sensor and associated processing system may create a time window within which a user impact above a particular threshold value registers as a desirable user input. This scenario is illustrated in FIG. 2 where at a time of approximately 1 second an impact event window opens as depicted by line 215. The impact event window closes at a time of approximately 6 seconds as depicted by line 220. Thus, the user must make an impact greater than threshold value of X g's between a time of 1 second and 6 seconds after the alarm sounds. Such an input may cause the calendar alert to be acknowledged and cease. As illustrated in FIG. 2, first peak 210 and third peak 225 are outside of the window and don't qualify as a user inputs. However, second peak 230 is within the event window and is greater than threshold level of X g's, thus the second peak qualifies as a user input. The impact event window may be significantly different than illustrated and the function of the user input may be customized. As an example, after an activation event such as a calendar alarm, electronic device 100 may open an impact event window (line 215) at approximately 0.5 seconds after the alarm sounds. Such a delay in opening the window may be used to negate possible false input from the vibrations of an active vibrate mode on electronic device 100. The particular function of the user input may be customized In other embodiments the processing system may be configured to determine the difference between one, two and three impacts within a particular time frame. Each number of impacts may represent a unique command that can be distinguished from one another, similar to the way in which a mouse distinguishes between one click and two clicks. FIG. 3 illustrates an accelerometer waveform 305 progressing left to right from a time of 0 seconds to a time of 10 seconds. A vertical axis represents the gravitational force (g-forces) experienced by the accelerometer that are sent to the processing system. The baseline acceleration is 0 g's, a threshold acceleration is set at X g's and the scale has a maximum of Y g's. The time scale, waveforms and the g-force values of FIG. 3 are purely for illustrative purposes and the actual parameters may be different in embodiments. In this embodiment it is not necessary that an activation event occurs. Thus, in some embodiments, as long as the processing system is active, it can detect these inputs at any time.

In one embodiment the processing system is configured to detect two impacts separated by a particular time delay. In this embodiment a first acceleration peak 310 above a threshold g-force value of X is detected at a time of approximately 2 seconds, identified by line 315. In this embodiment the processing system is configured to look for a second acceleration that occurs between approximately 2 seconds to 5 seconds after the first impact event. The window for the second event opens at line 320 at approximately 4 seconds and the window closes at approximately 7 seconds at line 325. In some embodiments there may only be a window opening (line 320) or a window closing (line 325). In FIG. 3, second acceleration peak 330 is above threshold value X and within the window between lines 320 and 325. Thus second peak 330 qualifies as the second impact event and distinguishes this command from a single impact command and a three impact command. Such a method may be employed to distinguish two, three and four or more impact events from one another. Multiple time windows may be used and may be user configurable. Such a method may also be employed to distinguish a specific sequence and timing of impact events such as, but not limited to, two quick impacts followed by a long silence and one more impact. Myriad sequences of impacts may be used to command electronic device 100. The different impact sequences may customized as well as their related commands to the electronic device.

Referring back to FIG. 1, in further embodiments, a training and/or calibration mode may be used to aid dock 100 in distinguishing an intentional user command (e.g., knock) from other impacts (e.g., a slap) on surface 145. For example, in one embodiment a user may mate electronic device 100 with dock 105 and set them on surface 145 that the user intends to interact with. A user may then activate a training mode on electronic device 100. A user may initiate a training mode where, for example, the user pushes button to activate the training mode then performs an impact command to be learned. The interface for the training mode may be on the display screen of electronic device 100 and may use communication protocols the electronic device and docking station understand. In other embodiments, the training mode may be indicated by a separate screen/lights on dock (e.g., one or more LED lights where light turns on to indicate entering learning mode, blinks in response to capturing command, etc.) Electronic device 100 may then instruct the user to impact surface 145 in the particular way the user desires to command the electronic device. For example, a user may predominantly use his knuckles to impact surface 145 creating a narrow, high g-force peak. Alternatively, a user may use the palm of their hand to create a broader, lower g-force peak. The characteristics of the user's impact may be analyzed by electronic device 100 using vibration data from a vibration sensor in dock 105. Parameters from the training impact may then be used to program a processing system within dock 105 to only respond when an impact having those particular parameters is detected. More specifically, other impacts may be filtered out and not responded to. Such a process may not only be used to train the system to respond to a particular knock that the user desires to use, but to also take into account the surface upon which docking station 105 is disposed. For example, a soft surface may experience different vibrations from a user's knock than a hard surface. Thus, in the training and/or calibration mode electronic device 100 may account for myriad variations in the environment and recognize the particular way in which the user desires to command electronic device 100.

Figure 4:
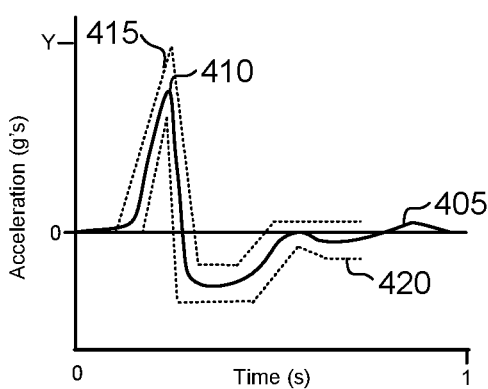
FIG. 4 is an example accelerometer sensor signal used in a training mode.

FIG. 4 illustrates an example of one embodiment where the processing system may be trained to recognize a particular impact event. FIG. 4 illustrates an accelerometer waveform 405 progressing left to right from a time of 0 seconds to a time of 1 second. A vertical axis represents the gravitational force (g-forces) experienced by the accelerometer that are sent to the processing system. The baseline acceleration is 0 g's and the scale has a maximum of Y g's. The time scale, waveforms and the g-force values of FIG. 4 are purely for illustrative purposes and the actual parameters may be different in embodiments. After a training mode is initiated, the processing system may record a user impact event such as peak 410 and the remainder of accelerometer waveform 405 out to a time of 1 second. After the waveform is captured the processing system may apply an upper bound 415 and a lower bound 420 to waveform 405. Upper bound 415 and lower bound 420 may be created using myriad algorithms including, but not limited to smoothing waveform 405 and offsetting by a particular g-force value such as 1 g or by a percentage such as ten percent.

Figure 5:
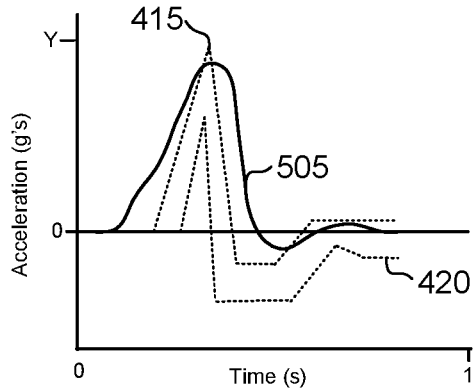
FIG. 5 is an example accelerometer sensor signal used in a training mode.

Once upper bound 415 and lower bound 420 are set by the processing system, the system can use those bounds to recognize an impact event with similar characteristics. A user impact event is illustrated in FIG. 5 using upper bound 415 and lower bound 420 learned in FIG. 4. As illustrated, waveform 505 from the user does not fit within upper bound 415 and lower bound 420, thus it will not be recognized as a desired user impact event. This is only one illustrative example and myriad other shapes, sequences and algorithms may be used without departing from the invention.

In further embodiments such training and/or calibration modes may be used to customize the user's interaction with electronic device 100. For example, in some embodiments a user may desire electronic device to perform a first action by impacting surface 145 once and to perform a second action by impacting the surface twice. In further embodiments, impacts may be associated with activation events on electronic device 100. For example, the user may program electronic device such that when the user is notified of an incoming phone call, one impact answers the call, two impacts silences the call ringtone and three impacts sends the call immediately to voice mail. In other embodiments a user may program electronic device 100 to answer a call when the user impacts surface 145 with his knuckles and silence the call when a user impacts the surface with their palm.

In further embodiments a geographic location sensor may be used in conjunction with a training and/or calibration mode. For example, in some embodiments a GPS sensor, wireless location sensor or other location determination system may be used to determine the location of electronic device 100 and docking station 105 and the training and/or calibration associated with that particular location. For example, in some embodiments a user may associate a particular operating mode with their bedroom where impact events are used to interact with the alarm function. In other embodiments a user may associate a different operating mode with their living room where impact events are used to interact with the music playing function on electronic device 100. Thus, electronic device 100 and dock 105 may perform different actions based on impact events that occur in different geographic locations. The geographic location sensor may be disposed in dock 105 or electronic device 100.

In further embodiments, the multiple axes of an impact sensor may be used to aid dock 105 in distinguishing between a user command (e.g., knock) from other impacts on surface 145. For example, in one embodiment a user may activate a vibrate mode on electronic device 100 or another electronic device disposed on surface 145. A vibration from a device in a vibrate mode may excite two or more axes of the accelerometer more than a third axis, compared to a knock that may excite one axis of the accelerometer more than a second and a third axes. The differences between the relative levels of excitation of the axes and/or the signature of the excitation of the three axes may be used to aid in distinguishing a user command (e.g., knock) from other impacts (e.g., vibration) on surface 145.

Thus, a new method of interacting with the many features and functions of an electronic device is disclosed. In further embodiments, other interactions may be include interacting with a calendar reminder, texting, social media alerts, voice mail notifications, stock market updates, and myriad other applications.

In some embodiments, one or more of the impact event sensors in dock 105 may comprise an accelerometer. In further embodiments one or more of the accelerometers may be an AC response or a DC response type of sensor. In an AC-response accelerometer, the output may be AC coupled. An AC coupled device may be suitable for measuring dynamic events whereas a DC-response accelerometer may be DC coupled, and may respond down to zero Hertz. A DC-response accelerometer may therefore may be used to measure static, as well as dynamic acceleration. Depending upon the particular type of user impact events to be measured one or more accelerometers of differing types may be employed in dock 105.

In some embodiments the accelerometers may comprise a piezoelectric sensor based on lead zirconate titanate ceramics (PZT) which offer very wide temperature range, broad dynamic range, and wide bandwidth (usable to >10 kHz). In other embodiments a type of piezoelectric accelerometer that provides voltage output instead of charge may be used. This type may be configured with the charge amplifier incorporated inside the housing of the accelerometer. Capacitive type (based on the capacitance changes in the seismic mass under acceleration) accelerometers may also be used and are common in applications such as automotive air-bags and mobile devices. They may employ Micro-Electro-Mechanical Systems (MEMS) fabrication technology which brings economy of scale to high volume applications, hence lower manufacturing cost. Piezoresistive technology is another commonly used sensing technology for DC response accelerometers. Instead of sensing the capacitance changes in the seismic mass (as in a capacitive device), a piezoresistive accelerometer produces resistance changes in the strain gages that are part of the accelerometer's seismic system. These and other types of sensors may be used for the vibration sensor.

Referring back to FIG. 1, in some embodiments it may be desirable to interact with electronic device 100 by means of a contactless gesture. One or more contactless sensors 160 may be employed in docking station 105 and/or electronic device 100 to continuously monitor for contactless gestures (e.g., waving hand 165 from left to right, moving one's hand closer to the electronic device or moving one's hand in a circular motion). In further embodiments, contactless sensors 160 may monitor for contactless input without requiring "waking" or the activation of electronic device 100. In some embodiments, contactless sensors 160 may be disposed within docking station 105 that may have a dedicated power supply and the requisite processing to detect and identify an attribute value of a contactless gesture. These features and others will be discussed in more detail below.

In one embodiment, electronic device 100 may notify docking station 105 of a particular operating state of the electronic device and the docking station may detect an attribute value one or more contactless gestures using contactless sensors 160. A message may be transmitted by docking station 105 to electronic device 100 based on the operating state of the electronic device and the attribute value of the contactless gesture. Electronic device 100 may then perform an action based on the message.

For example, electronic device 100 may notify docking station 105 that it is in a music playback operating state. Docking station 105 may then continuously monitor for contactless input using contactless sensors 160. A contactless gesture (e.g., a user with palm open towards the docking station makes a pushing motion towards the docking station) may be made by a user and dock 105 may detect an attribute value of that gesture (e.g., hand moving towards docking station a distance greater than 10 centimeters). Docking station 105 may then determine that the attribute value corresponds to advancing to the next music track. Docking station 105 may then transmit a message to electronic device 100 telling it to advance to the next music track and the electronic device executes the command. As a further example, electronic device 100 may be in a calendar operating state and a calendar alarm may sound. The user may make the same hand motion (i.e., a user with palm open towards the docking station makes a pushing motion towards the docking station) and the docking station may this time transmit a message to electronic device 100 to silence the alarm. Thus, docking station 105 may change the transmitted message from a particular gesture based on the current operating state of electronic device 100. These embodiments and others with regard to contactless input will be described in greater detail below.

Examples of contactless gestures include, without restriction, an object moving relative to or remaining stationary in front of electronic device 100 and/or docking station 105 (devices). In other embodiments, a gesture relative to the devices may include portions of the object moving relative to each other and to the devices. For example, two fingers of a hand moving close together or further apart may be a contactless gesture. As another example, a rotation of one's hand may also be a contactless gesture, where there is no translation of the object, but only rotation. As yet another example, complex contactless gestures may be recognized such as, but not limited to, one's hand transitioning from a fingers extended position to a first or to a point and shoot formation. In further embodiments the mere presence or non-presence of an object may be considered a contactless gesture. All of these movements may be considered contactless gestures relative to the devices, but in no way do these examples limit what may be considered contactless gestures relative to the devices. Contactless gesture detection may be preconfigured from the manufacturer or it may be user configurable.

Examples of attribute values of contactless gestures include, without limitation, the distance of the object performing the gesture from the devices, the velocity of object making the gesture, the number of repetitions of the gesture, the relative motion of one object to another, the presence or non-presence of an object and the like. Myriad other attribute values may be detected using one or more sensors within the devices.

Contactless sensor 160 in FIG. 1 is only for illustrative purposes and may include any sensor capable of detecting the presence of an object, the temperature of an object, the distance of an object and/or the motion of an object. For example, some embodiments may employ one or more optical imaging sensors that convert an optical image into an electronic signal. As used herein, optical imaging may include any spectrum, and in some embodiments particularly the visible and infrared. Example sensors may include charge-coupled device (CCD) or complementary metal-oxide-semiconductor (CMOS) active pixel sensors. Such optical sensors can be used in conjunction with a central processing unit and an image processing algorithm to determine the velocity of an object, a gesture of an object and the distance of an object from the devices. The determination of the velocity and gesture of an object may be calculated using commercially available "blob detection" and "blob analysis" vision software. The change in distance of an object may be determined by employing the change in apparent size of the object in the image and the actual distance may be determined by starting the object from a known starting point such as touching the sensor or a location proximate the sensor. Other algorithms are known to those of skill in the art and may also be employed.

In some embodiments a 3-D infrared imaging sensor may be used. These sensors may consist of an LED block, a CCD imaging sensor and an Application Specific Integrated Circuit (ASIC). Such sensors may work by emitting light from the LED block and calculating the time it takes for that light to reflect back from people or objects in its field of view. Computer algorithms calculate the distance data while the ASIC performs background light separation computations separating ambient light from the light reflected by the target on a pixel-by-pixel basis. The final data may be converted to Cartesian coordinates that can be used to detect contactless gestures and their attributes.

Some embodiments may employ one or more acoustic sensors. Such sensors may be configured to respond to voice commands, clapping, a dog barking, knocking (impacts) or other acoustic noises. In other embodiments an acoustic sensor may be used in place of, or in conjunction with, a vibration sensor to discern a user communicating with electronic device 100 by impacting surface 145, for example with a knocking action. In yet further embodiments docking station 105 may be equipped with a microphone that can detect audible commands from the user.

Further embodiments may employ one or more ultrasonic transceiver sensors. Such sensors work on a principle similar to radar or sonar. Ultrasonic sensors generate high frequency sound waves and evaluate the echo which is received back by the sensor. Sensors calculate the time interval between sending the signal and receiving the echo to determine the distance to an object. Some sensors have transmitters that are separate from the receivers while others may be a substantially unitary device comprising both a transmitter and a receiver. In some embodiments a plurality of ultrasonic sensors are used which can form a reasonably detailed "sound-based" image of the object. Ultrasonic sensors can be used in conjunction with a central processing unit to determine the velocity, acceleration and rotation of an object, a gesture of an object and the distance of an object from the electronic device.

Still further embodiments may employ a non-imaging optical sensor. Such sensors work similar to the ultrasonic sensors discussed above, however instead of generating high frequency sound waves these sensors generate light waves which are reflected back to the sensor by the object. The light source may be, for example, infra-red, white light, a laser or other type of light. The sensors calculate the time interval and sometimes the frequency and/or phase shift between sending the signal and receiving the echo to determine the distance to an object. Some sensors may also be able to determine the direction of the reflected light and use that to detect the position or distance of the object. Some non-imaging optical sensors have transmitters that are separate from the receivers while others may be a substantially unitary device including both a transmitter and a receiver. In some embodiments a plurality of non-imaging optical sensors are used which can form a reasonably detailed "light-based" image of the object. Non-imaging optical sensors can be used in conjunction with a central processing unit to determine the velocity, acceleration and rotation of an object, a gesture of an object and the distance of an object from the electronic device.

Other embodiments may employ one or more other sensors such as a proximity sensor, a hall-effect sensor, a radar sensor, a thermal sensor, etc. Myriad sensors may be used on docking station 105 and/or electronic device 100 (devices) and are known by those of skill in the art. Further embodiments may employ more than one sensor and the plurality of sensors may be used by themselves or in conjunction with each other. Some embodiments may have more than one sensor of the same type disposed on a single face of the device while other embodiments may have sensors of different types disposed on a single face of the device. Further embodiments may have sensors disposed on separate faces of the device. For example, in one embodiment both an optical imaging sensor and a non-imaging optical sensor may be disposed on a device. The optical imaging sensor may be used to determine the velocity of the object while the non-imaging optical sensor may be used to determine the distance of the object from the device. In further embodiments a non-imaging optical sensor may be disposed on a left face of the device and an optical imaging sensor may be disposed on a front face of the device. The non-imaging optical sensor may be used to activate a contactless sensing mode of the device and the optical imaging sensor may be used to determine the velocity of an object, a gesture of an object and/or the distance of an object from the device. Myriad combinations and locations of sensors may be employed on the devices.

In some embodiments an array of contactless sensors 160 may be used on the devices. An array of sensors may enable greater resolution of the contactless gesture than a single sensor. For example, an array of infrared sensors may enable more accurate detection of a particular gesture such as a rotation of a hand as compared to the use of a single sensor.

In further embodiments, the array may be distributed across the surface of the devices such that a user may make a gesture from any side and it can be detected. In further embodiments, multiple sensors, of the same or different types may be used to nullify errors in sensing. For example, an infrared sensor may be used in conjunction with a camera and the infrared sensor data may be used to detect that the object is not warm enough to be a user's hand and reject the signal acquired by the camera sensor.

Figure 6:
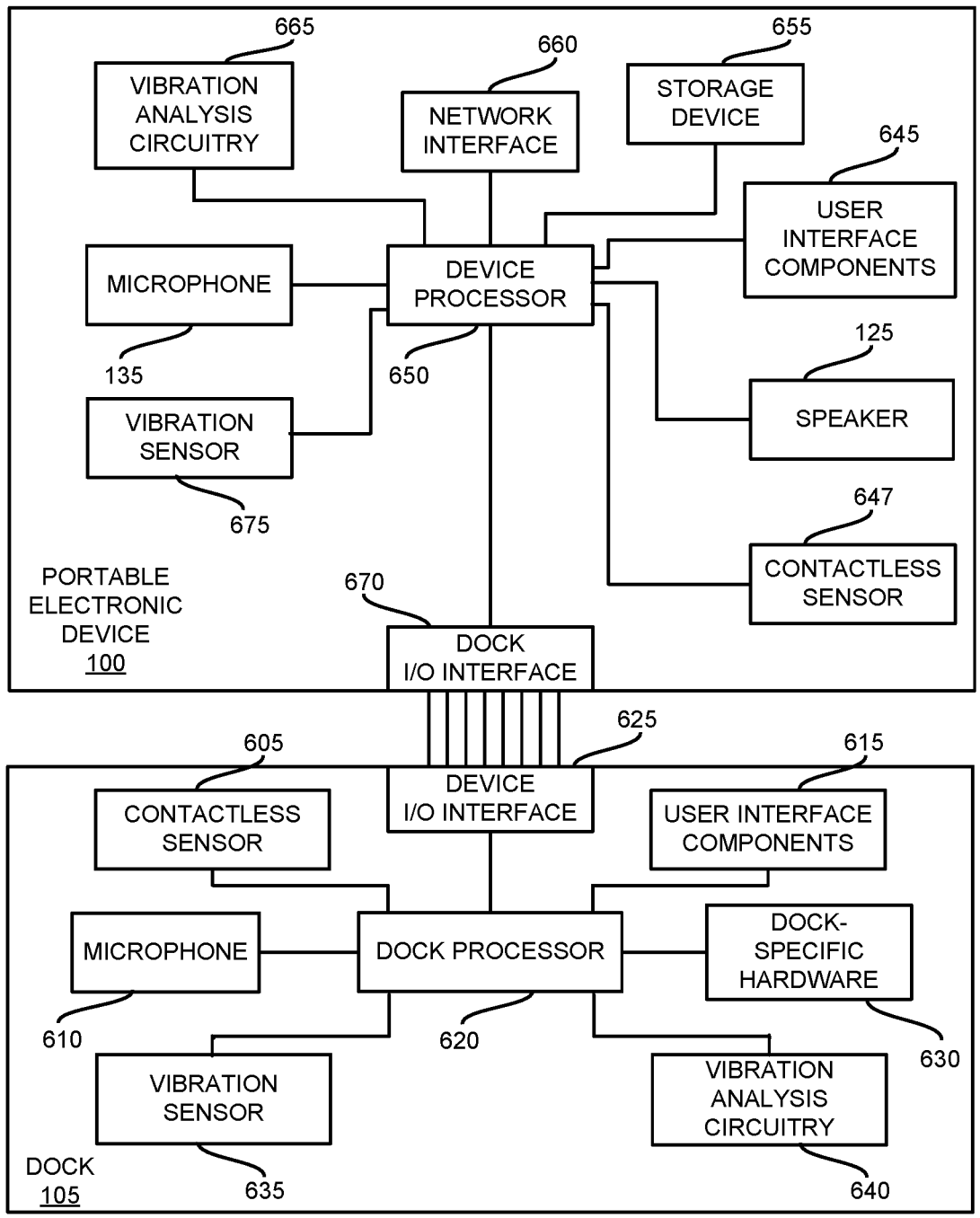
FIG. 6 is a simplified schematic of an electronic device mated to a docking station according to one embodiment of the invention.

FIG. 6 illustrates a simplified block diagram showing various components of a system according to an embodiment of the present invention, the system including dock 105 and portable electronic device 100 shown in FIG. 1. Dock 105 can include contactless gesture sensor 605 and microphone 610 in addition to other user interface components 615, a processor 620, a device I/O interface 625, and other dock-specific hardware 630. Dock 105 may also include one or more vibration sensors 635 and in some embodiments, vibration analysis circuitry 640. As discussed herein, myriad optical and non-optical sensors may be employed in electronic device 100 and/or docking station 105. One of skill in the art will recognize that the simplified block diagram of FIG. 6 can be easily modified to include a plurality of additional sensors and functionality, as needed.

Microphone 610 can include one or more acoustic-to-electric transducers or sensors configured to convert sounds into an electrical signal. Other embodiments may include a speaker having one or more electroacoustic transducers configured to produce sound in response to an electrical audio signal.

Other user interface components 615 can include any other user-operable input devices such as control buttons, a touch pad, touch screen, scroll wheel, click wheel, dial, button, switch, keypad, or the like, as well as output devices such as a display screen, indicator lights, headphone jacks, or the like, together with supporting electronics (e.g., digital-to-analog or analog-to-digital converters, signal processors, and/or the like). Depending on the implementation of a particular dock 100, a user can operate user interface components 615 to invoke the various functionalities of dock 100.

Contactless sensor 605 can include any sensor capable of detecting the presence of an object, the temperature of an object, the distance of an object and/or the motion of an object. Contactless sensors are described in detail herein.

Vibration sensor 635 may comprise one or more vibration sensors of various types as discussed above. Vibration sensor 635 may be configured to generate a vibration signal in response to a vibration of a surface on which the docking station is disposed. In some embodiments, vibration analysis circuitry may analyze the vibration signal and identify one or more predefined user impact commands. In other embodiments, dock processor 620 may perform the analysis and identification.

Dock processor 620 and/or vibration analysis circuitry 640 can include, for example, one or more integrated circuits such as single-core or multi-core microprocessors and/or microcontrollers executing program code to perform various functions associated with dock 105. For example, processor 620 and/or vibration analysis circuitry 640 can receive vibration signal input from vibration sensor 635, and in response to the input, transmit a message to portable electronic device 100 to activate a command on the portable electronic device. For example, dock processor 620 and/or vibration analysis circuitry 640 may identify a user impact command from vibration sensor 635 output and may transmit a command to portable electronic device 100 to cease an alarm.

In further embodiments, dock processor 620 may receive contactless sensor data from contactless sensor 605 and may analyzed the sensor data to determine a gesture attribute. Dock processor may then use the gesture attribute with a lookup table to determine a corresponding command for a current operating state of electronic device 100. Dock processor may then construct a message to transmit to electronic device 100 based on the operating state of the electronic device and the attribute value.

Vibration analysis circuitry 640 can include any suitable hardware and/or software for facilitating a vibration signal recognition mode of portable electronic device 100 and/or dock 105. A vibration signal recognition mode can include any operational mode of portable electronic device 100 and/or dock 105 wherein a user impact command (e.g., a knock on the surface on which the docking station or device are disposed), as distinguished from touch or button input, is used to provide a user access to the various services, applications, and/or functionalities of portable electronic device 100. In some embodiments, vibration analysis circuitry 640 may analyze the pulse duration, the frequency, the amplitude or other parameters of the vibration signal to determine if it's an impact command from a user desiring to communicate with electronic device 100, or if it's an impact from another event such as a user setting down a glass on the table.

Dock-specific hardware 630 can include any other components that may be present in dock 105 to enable its functionality. For example, in embodiments of the present invention, dock-specific hardware 630 can include one or more storage devices using fixed or removable storage media, a GPS receiver, a power supply and/or power management circuitry, environmental sensors (e.g., temperature sensor, pressure sensor, accelerometer, chemical sensor, etc.), and/or the like. It is to be understood that any type of dock functionality can be supported by providing appropriate dock-specific hardware 630.

Device I/O interface 625 can allow dock 105 to communicate with portable electronic device 100. In embodiments of the present invention, device I/O interface 625 can include a connector that mates directly with a connector (e.g., receptacle connector) included in portable electronic device 100. Such a connector can be used to supply power to portable electronic device 100 and/or receive power from portable electronic device 100, to send and/or receive audio and/or video signals in analog and/or digital formats, and to communicate information using one or more data communication interfaces such as USB, UART, Serial, and/or FireWire. Proprietary interfaces may also be used such as Apple ID and/or Apple Mikey bus. Other connectors may also be used; for example, device I/O interface 625 can incorporate a standard USB connector and can connect to dock I/O interface 625 of portable electronic device 100 via an adapter cable. In other embodiments of the present invention, device I/O interface 625 can support wireless communication (e.g., WiFi, Bluetooth, or other wireless protocols) in addition to or instead of wired communication channels.

Dock 105 can be any electronic apparatus that interacts with portable electronic device 100. In some embodiments, dock 105 can provide remote control over operations and/or services of portable electronic device 100, or a remote user interface that can include both input and output controls. Dock 105 in various embodiments of the present invention can control any function of portable electronic device 100. For example, dock 105 can transmit a message to portable electronic device 100 to activate a vibration signal analysis mode of portable electronic device 100. In embodiments of the present invention, portable electronic device 100 can also control operations of dock 105, such as transmitting a vibration sensor activation signal to dock 105 for receiving user impact commands.

Portable electronic device 100 can provide computing, communication and/or media playback capability. Portable electronic device 100 can include microphone 135, speaker 125, and user interface components 645, contactless sensor 647, in addition to a device processor 650, a storage device 655, a network interface 660, vibration analysis circuitry 665, a dock input/output (I/O) interface 670, and one or more vibration sensors 675. Portable electronic device 100 can also include other components (not explicitly shown) such as a battery, power controllers, and other components operable to provide various enhanced capabilities.

Microphone 135 can include one or more acoustic-to-electric transducers or sensors configured to convert sounds into an electrical signal. Speaker 125 can include one or more electroacoustic transducers configured to produce sound in response to an electrical audio signal.

Vibration sensor 675 may comprise one or more vibration sensors of various types as discussed above. Vibration sensor 675 may be configured to generate a vibration signal in response to a vibration of a surface on which the docking station 105 or portable electronic device 100 is disposed. In some embodiments, vibration analysis circuitry may analyze the vibration signal and identify one or more predefined user impact commands. In other embodiments, portable electronic device processor 650 may perform the analysis and identification.

User interface components 645 can include one or more input devices such as a touch pad, touch screen, scroll wheel, click wheel, dial, button, switch, keypad, or the like, as well as output devices such as a video screen, indicator lights, headphone jacks, or the like, together with supporting electronics (e.g., digital-to-analog or analog-to-digital converters, signal processors, or the like). A user can operate user interface components 645 to invoke the various functionalities of portable electronic device 100 and can view and/or hear output from portable electronic device 100 via output devices of user interface components 645.

Contactless sensor 647 can include any sensor capable of detecting the presence of an object, the temperature of an object, the distance of an object and/or the motion of an object. Contactless sensors are described in detail herein.

Device processor 650 can include, for example, one or more integrated circuits such as single-core or multi-core microprocessors and/or microcontrollers executing program code to perform various functions and operations associated with portable electronic device 100. In various embodiments, processor 650 can execute a variety of programs in response to program code and can maintain multiple concurrently executing programs or processes. At any given time, some or all of the program code to be executed can be resident in processor 650 and/or in storage media such as storage device 655.

Through suitable programming, device processor 650 can provide various functionality for portable electronic device 100. For example, in response to an activation event such as a calendar alarm, processor 650 can activate a vibration sensor analysis mode of portable electronic device 100 or dock 105. Device processor 650 can receive vibration signal input from device vibration sensor 675 and/or dock vibration sensor 105. In some embodiments, vibration analysis circuitry 665 may analyze vibration signals from the vibration sensors and identify one or more predefined user impact commands. In other embodiments, device processor 650 may perform the analysis and identification. Device processor 650 can also execute other programs to control other functions of portable electronic device 100, including application programs that may be stored in storage device 655.

In further embodiments, device processor 650 may receive a message from dock processor 620 containing a command for a current operating state. Device processor 650 may execute the command.

Storage device 665 can be implemented using disk, flash memory, or any other non-transitory storage medium, or a combination of media, and can include volatile and/or non-volatile media. In some embodiments, storage device 665 can store data objects such as audio files, video files, image or artwork files, information about a user's contacts (names, addresses, phone numbers, etc.), information about a user's scheduled appointments and events, notes, and/or other types of information. In some embodiments, storage device 665 can also store one or more application programs to be executed by processor 650 (e.g., video game programs, personal information management programs, media playback programs, etc.).

Network interface 660 can provide voice and/or data communication capability for portable electronic device 100. In some embodiments network interface 660 can include radio frequency (RF) transceiver components for accessing wireless voice and/or data networks (e.g., using cellular telephone technology, advanced data network technology such as 3G, EDGE or 4G, WiFi (IEEE 802.11 family standards), or other mobile communication technologies (or any combination thereof), components for short-range wireless networking (e.g., using Bluetooth standards), GPS receiver components, and/or other components. In embodiments of the present invention, network interface 660 can provide wired network connectivity (e.g., Ethernet) in addition to or instead of a wireless interface. Network interface 230 can be implemented using a combination of hardware (e.g., driver circuits, antennas, modulators/demodulators, encoders/decoders, and other analog and/or digital signal processing circuits) and software components.

Vibration analysis circuitry 665 can include any suitable hardware and/or software for facilitating a vibration signal recognition mode of portable electronic device 100 and/or dock 105. A vibration signal recognition mode can include any operational mode of portable electronic device 100 wherein a user impact command (e.g., a knock on the surface on which the docking station or device are disposed), as distinguished from touch or button input, is used to provide a user access to the various services, applications, and/or functionalities of portable electronic device 100. In some embodiments, vibration analysis circuitry 665 may analyze the pulse duration, the frequency, the amplitude or other parameters of the vibration signal to determine if it's an impact from a user desiring to communicate with electronic device 100, or if it's an impact from another event such as a user setting down a glass on the table.

Dock I/O interface 670 can allow portable electronic device 100 to communicate with dock 105. In embodiments of the present invention, dock I/O interface 670 can include a connector that mates directly with a connector included in dock 105. Such a connector may correspond to the connectors used in various iPod, iPhone, and iPad® products, as well as the supporting circuitry. The connector can provide connections for power and ground as well as for one or more data communication interfaces such as Universal Serial Bus (USB), FireWire (IEEE 1394 standard), and/or universal asynchronous receiver/transmitter (UART). Proprietary interfaces may also be used such as Apple ID and/or Apple Mikey bus. In embodiments of the present invention, the connector provides dedicated power and ground contacts, as well as some number (e.g., four) of programmable digital data contacts that can be used to implement different communication technologies in parallel. For example, two pins can be assigned as USB data pins (D+ and D−) and two other pins can be assigned as serial transmit/receive pins (e.g., implementing a UART interface). The assignment of pins to particular communication technologies can be negotiated while the connection is being established. In embodiments of the present invention, the connector can also provide connections for audio and/or video signals, which may be transmitted to or from portable electronic device 100 in analog and/or digital formats. Thus, dock I/O interface 670 can support multiple communication channels, and a given dock can use any or all of these channels. In some embodiments of the present invention, dock I/O interface 670 can support wireless communication (e.g., via WiFi, Bluetooth, or other wireless protocols) in addition to or instead of wired communication channels.

It will be appreciated that the system configurations and components described herein are illustrative and that variations and modifications are possible. Portable electronic device 100 and/or dock 105 may have other capabilities not specifically described herein.

Connectors at the respective I/O interfaces 625, 670 of portable electronic device 100 and dock 105 can be complementary, or not, as desired. Where two connectors are not complementary, an adapter (not shown) can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while portable electronic device 100 and dock 105 are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Dock I/O interface 670 of portable electronic device 100 and device I/O interface 625 of dock 105 allow portable electronic device 100 to be connected with dock 105 and subsequently disconnected from the dock. As used herein, portable electronic device 100 and dock 105 are "connected" whenever a communication channel is established between their respective interfaces and "disconnected" when the channel is terminated. Such connection can be achieved via direct physical connection (e.g., with mating connectors), indirect physical connection (e.g., via a cable), and/or wireless connection (e.g., via Bluetooth or other suitable wireless protocol).

In some embodiments, portable electronic device 100 and dock 105 can communicate while connected by exchanging messages and data according to an "accessory protocol." The messages and data can be communicated, for example, using any wired or wireless transport medium provided by the relevant interfaces.

The accessory protocol can define a "universe" of messages that can be exchanged between portable electronic device 100 and any accessories connected thereto, such as dock 105. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated, as described below), while the payload provides all or part of the message data. The packet can also include error-detection or error-correction codes as known in the art.

In some embodiments, the messages can be logically grouped into a "general" message set and an "optional" message set. Every accessory and every portable electronic device that use the accessory protocol can be required to support at least the general message set. This message set can include messages enabling portable electronic device 100 and dock 105 to identify and authenticate themselves to each other and to provide information about their respective capabilities, including which (if any) of the messages in the optional set each supports. For example, the general message set can include a message dock 105 can send to portable electronic device 100 to list every message in the optional set that dock 105 is capable of sending and every message in the optional set that dock 105 is capable of receiving and acting on. The general message set can also include authentication messages that portable electronic device 100 can use to verify the purported identity and capabilities of dock 105 (or vice versa), and dock 105 (or portable electronic device 100) may be blocked from invoking certain (or all) of the optional messages if the authentication is unsuccessful.

Figure 7:
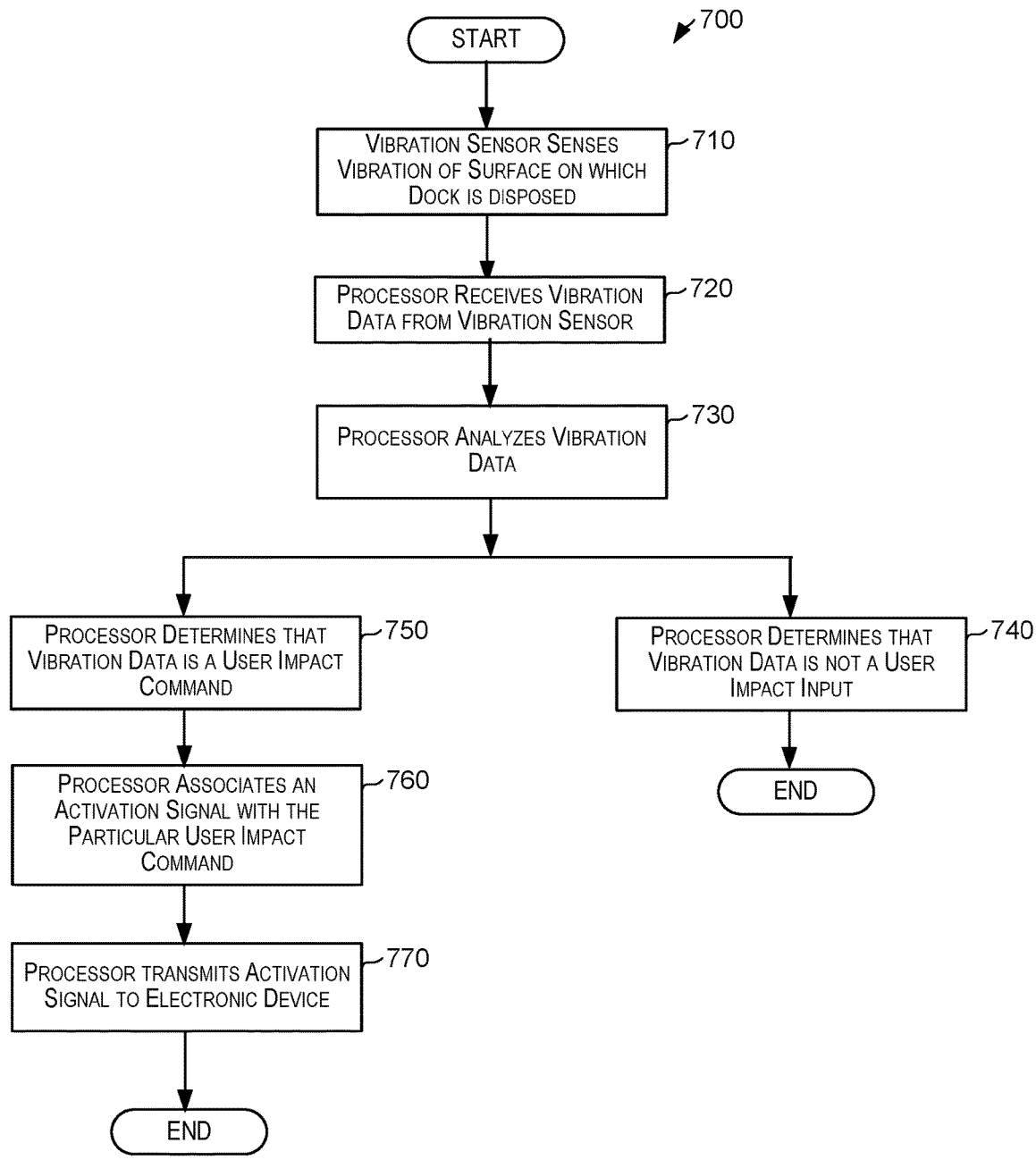
FIG. 7 is a method of using vibration input according to an embodiment of the invention.

FIG. 7 depicts a simplified flowchart 300 illustrating a general method for interacting with an electronic device where a user may impact a surface upon which the device and/or the device mated to a docking station may be disposed. The processing depicted in FIG. 7 may be implemented in software (e.g., code, instructions, program) executed by one or more processors, in hardware, or combinations thereof. The software may be stored on a non-transitory computer-readable storage medium (e.g., stored on a memory device). The particular series of processing steps depicted in FIG. 7 is not intended to be limiting.

As depicted in FIG. 7, the method may be initiated at 710 when a vibration sensor in the docking station senses the vibration of a surface on which the docking station is disposed. In some embodiments, the vibration sensor is powered with a separate power supply from the electronic device. This may enable reduced power consumption for general energy savings and/or not detract from the useful life of the electronic device, among other benefits.

At 720, the processor within the docking station receives vibration data from the vibration sensor. In some embodiments, the vibration sensor may continually transmit vibration data to the processor while in other embodiments vibration data may only be transferred after an activation event such as a calendar alarm.

At 730, the processor analyzes vibration data from the vibration sensor in the docking station. The processor may convert analog data from the vibration sensor to digital data and perform myriad manipulations such as smoothing and the like. The processor may use a threshold value to determine if the vibration data exceeds a threshold value. In other embodiments the processor may compare the vibration data to a time window to determine if impact events greater than a threshold value occurred within a specific time window. In further embodiments, the processor may look for a particular sequence or timing of impact events. In yet further embodiments, the processor may determine of the vibration data meets a learned or trained event characteristic signal. Myriad methods may be used by the processor to analyze the vibration data. Myriad methods may also be used to aid the processor in distinguishing an impact event from a user from other vibrations. Calibration and/or training routines, location sensing, additional sensors, tri-axial accelerometers and other means may be used, but in no way is the invention limited to these means.

At 740 the processor determines that the vibration data is not a user impact input. The vibration data did not meet any of the parameters of a user input so no further action is taken by the system.

At 750, the processor determines that the vibration data meets the requirements of a user impact command. As discussed above, the vibration data meets the threshold level, the timing and/or other parameters required to identify a user impact command.

At 760, the processor associates an activation signal with the particular user impact command. More specifically, in some embodiments, the processor may associate two sequential impact commands with an activation signal of snooze for 10 minutes. In other embodiments, the processor may associate three sequential impact commands with an activation signal of snooze for 15 minutes. Thus, myriad user commands may be used wherein each user command is correlated to a particular activation signal to the portable electronic device.

At 770, the processor transmits an activation signal to the electronic device. In one embodiment, the processor will first send a wake up signal to the electronic device to wake it from a sleep mode. In some embodiments the processor may send raw vibration data to the electronic device so the electronic device can, for example, determine if the user input was one, two or three knocks. In other embodiments the processor in the dock may determine what the user input was and signal the electronic device, for example, that the user knocked once, twice, or three times. In some embodiments the activation signal can be a command comprising a plurality of fields/bits using a language the Media Player understands (e.g., could be iAP commands used by Apple iPod and iPhone products).

Figure 8:
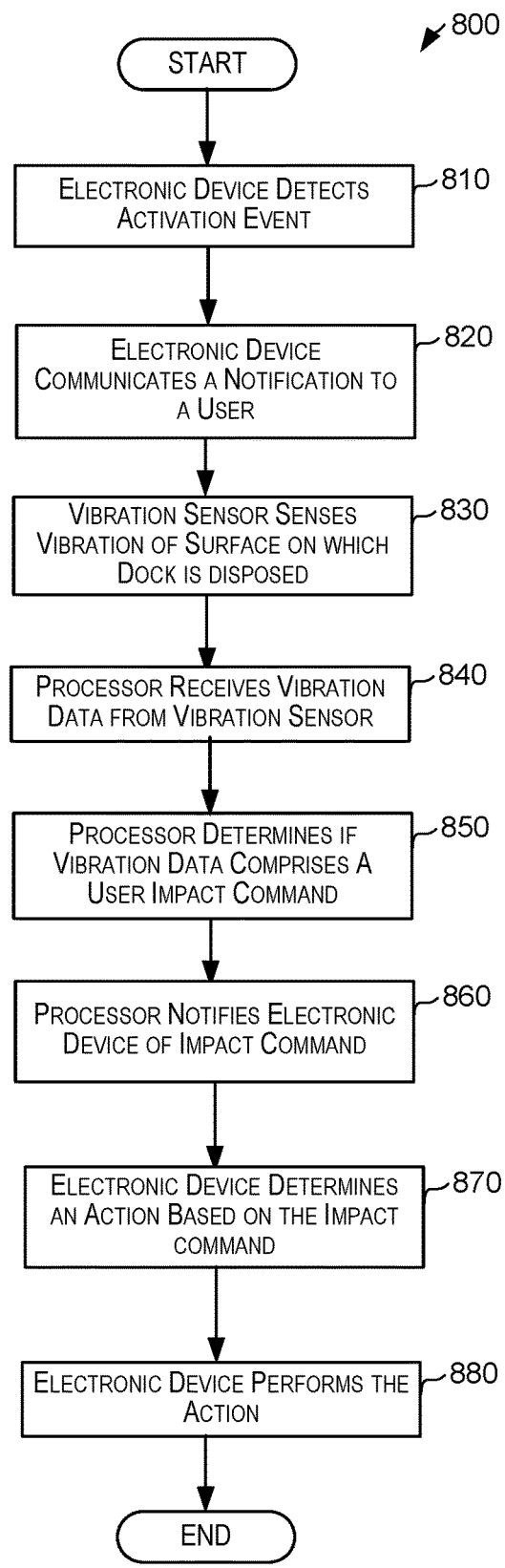
FIG. 8 is a method of using vibration input according to another embodiment of the invention.

FIG. 8 depicts a simplified flowchart 800 illustrating a general method for interacting with electronic device 100 where the user may not have to be within the field of view of the device according to some embodiments. The processing depicted in FIG. 8 may be implemented in software (e.g., code, instructions, program) executed by one or more processors, in hardware, or combinations thereof. The software may be stored on a non-transitory computer-readable storage medium (e.g., stored on a memory device). The particular series of processing steps depicted in FIG. 8 is not intended to be limiting.

As depicted in FIG. 8, the method may be initiated at 810 when the electronic device detects an activation event. For example, in some embodiments an activation event may be a wake up alarm, a calendar reminder, an incoming call, an incoming text, a social media notification, or other event.

At 820, the electronic device communicates a notification to the user, in response to the activation event. For example, in some embodiments the notification may be an audible and/or visible indication to the user such as an alarm tone, a flashing light or a screen banner.

At 830 the vibration sensor in the docking station senses the vibration of a surface on which the docking station is disposed. In some embodiments, the vibration sensor is powered with a separate power supply from the electronic device. This may enable reduced power consumption for general energy savings and/or not detract from the useful life of the electronic device, among other benefits.

At 840, the processor within the docking station may receive vibration data from the vibration sensor. In some embodiments, the vibration sensor may continually transmit vibration data to the processor while in other embodiments vibration data may only be transferred after an event.

At 850, the processor within the docking station may determine if the vibration data comprises an impact input from a user. In some embodiments the processor may use a filtering algorithm to distinguish the user command from other impacts on the surface. As discussed above, myriad methods may be used to aid the processor in distinguishing an user impact event from other vibrations. In some embodiments, calibration and/or training routines, location sensing, additional sensors, tri-axial accelerometers and other means may be used.

At 860, the processor notifies the electronic device if it has detected a user impact command. In one embodiment, the processor may first send a wake up signal to the electronic device to wake it from a sleep mode. In some embodiments the processor may send raw vibration data to the electronic device so the electronic device can, for example, determine if the user input was one, two or three knocks. In other embodiments the processor in the dock may determine what the user input was and signal the electronic device, for example, that the user knocked once, twice, or three times.

At 870, the electronic device determines an action to perform based on the vibration data. For example, if the vibration data comprises a single impact event (or knock) the device may determine a particular action to perform as compared to a double or triple impact event. In addition, the action to perform may be based upon the geographic location of the electronic device. For example, if the electronic device is in the bedroom, a single impact event may correspond to silencing an alarm, whereas if the electronic device is located in the living room a single impact event may correspond to opening the media player and playing the current song. In yet further embodiments, the action to perform may depend upon the type of activation event. For example, if the activation event is an incoming call, a single impact event may correspond to answering the call, as compared to the case if the activation event was a calendar reminder where a single impact event may correspond to dismissing the reminder.

At 880, the electronic device performs the action determined in 870. For example, if the action determined in 870 was to answer the incoming call, at 880 the electronic device would connect the incoming call and activate the speaker and the microphone so the user could engage in the call. In other embodiments other actions may be taken.

Figure 9:
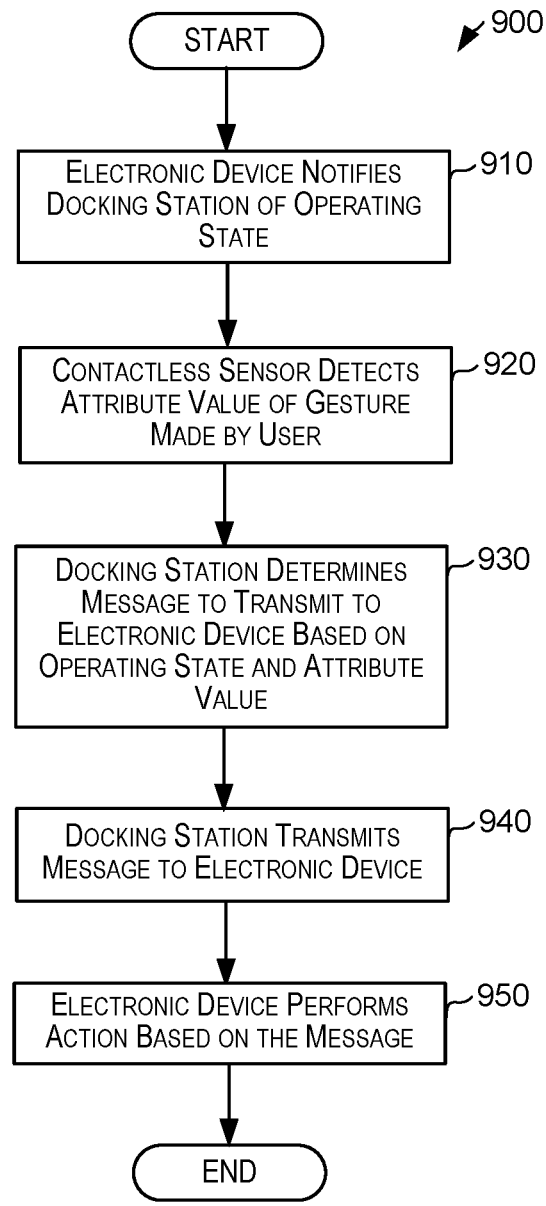
FIG. 9 is a method of using contactless gesture input according to another embodiment of the invention.

FIG. 9 depicts a simplified flowchart 900 illustrating a general method for interacting with electronic device 100 where the user may interact with the device using a contactless gesture according to some embodiments. The processing depicted in FIG. 9 may be implemented in software (e.g., code, instructions, program) executed by one or more processors, in hardware, or combinations thereof. The software may be stored on a non-transitory computer-readable storage medium (e.g., stored on a memory device). The particular series of processing steps depicted in FIG. 9 is not intended to be limiting.

As depicted in FIG. 9, the method may be initiated at 910 when the electronic device notifies the docking station of an operating state (e.g., active application) of the electronic device. For example, in some embodiments the electronic device may notify the docking station that it is currently in a music playback operating state or in a calendar operating state. In one embodiment the current operating state information may be stored in the docking station and employed in a subsequent procedure. In other embodiments the docking station may request the electronic device to transmit the operating state. In further embodiments, this step may be optional and the electronic device may not notify the docking station of the operating state and the docking station may be preprogrammed with default operating state information.

At 920, one or more contactless sensors disposed within the docking station may detect an attribute value of a contactless gesture made by a user who is proximate the docking station. For example, a contactless infrared sensor may be disposed within the docking station and recognize that the user has swiped their hand from left to right in front of the docking station. In this example the attribute value of the gesture may be a movement of an object within the field of view of the sensor from a left position, at least 100 centimeters, to a right position. In another embodiment, one or more contactless sensors may generate a signal in response to the contactless gesture and a processor may analyze the signal to determine one or more attributes of the gesture. In one embodiment, the particular sensors employed and/or the parameters of the sensors may be determined based upon the operating state of electronic device 100.

At 930 the docking station may determine a message to transmit to the electronic device based on the operating state and the attribute value of the gesture. For example, when in a music playback operating state, a left to right gesture attribute may correspond to advancing one song track and a right to left gesture attribute may correspond to rewinding one song track. As another example, when in a calendar operating state, a left to right gesture attribute may correspond to snoozing a calendar alarm for five minutes and a right to left gesture attribute may correspond to cancelling the calendar alarm. Thus, the same gesture may correspond to different messages depending on the particular operating state of the electronic device. In some embodiments a lookup table correlating particular operating state commands to a set of gesture attributes may be preprogrammed in the docking station. In other embodiments the electronic device may transmit the lookup table information to the docking station when it notifies the docking station of the operating state. In further embodiments, the lookup table may be a default preprogrammed table and not be transmitted to the docking station by the electronic device. In other embodiments, the message may be determined, in part, based on the power state of the docking station (e.g., if it is plugged in on A/C power, powered by an internal battery, powered by a laptop or powered by the electronic device).

At 940 the docking station may transmit a message to the electronic device. The message may contain a command as discussed above, such as advance one track, rewind one track, snooze a calendar alert or cancel a calendar alert. In other embodiments the message may include a plurality of commands, such as a first "wake up" command, followed by one or more subsequent commands such as advance one song track. The transmission may be executed using a myriad of wired and/or wireless protocols. One of skill in the art will recognize the myriad combinations of operating modes and messages that are possible, and the invention shall not be limited to these illustrative examples.

At 950 the electronic device may perform an action based on the transmitted message. Following the example above, the electronic device may wake up, advance one track, rewind one track, snooze a calendar alert and/or cancel a calendar alert.

As another illustrative example, resuming the method of FIG. 9 at 920, a first contactless sensor may be used to "wake" the electronic device such that a second contactless sensor disposed in the electronic device may be employed to detect the attribute value of the contactless gesture.

At 920 a first contactless sensor (e.g., a passive infrared sensor) may be disposed within the docking station and recognize that the user has swiped their hand from the left to the right in front of the docking station. In this example the attribute value of the gesture may be a movement of an object within the field of view of the sensor from a left position, at least 100 centimeters, to a right position.

At 930 the docking station may determine a message to transmit to the electronic device based on the operating state of the electronic device and the attribute value of the gesture. For example, the message may be to first "wake" the electronic device and to subsequently activate a more sophisticated secondary contactless sensor within the electronic device, such as a camera. The secondary contactless sensor within the electronic device may be capable of recognizing a second, more complex contactless gesture than the first contactless sensor.

At 940 the docking station may transmit the message of step 930 to the electronic device. The transmission may be executed using a myriad of wired and/or wireless protocols. In this example the message may cause the electronic device to wake up and activate a secondary contactless sensor, such as a camera. One of skill in the art will recognize the myriad combinations of operating modes and commands that are possible, and the invention shall not be limited to these illustrative examples.

At 950 the electronic device may perform the action based on the message. Following the example above, the electronic device may wake up and activate one or more secondary sensors, such as a camera, to recognize a subsequent gesture such as a "point and shoot" hand motion. In some embodiments the electronic device may notify the user with an audible or visible indicator that it is ready to receive a second gesture input. Such a configuration may be useful where power consumption is a concern and a low-power first contactless sensor may be used in the docking station to wake a more powerful second contactless sensor in the electronic device. The more powerful secondary contactless sensor in the electronic device may be able to recognize more complex gestures than the first contactless gesture sensor in the docking station. In further embodiments, both the first sensor and the second sensor may be disposed in the docking station, however the second sensor may only be activated upon a command from the first sensor.

In further embodiments, a processor within the docking station may be used to perform an analysis of the contactless sensor data from contactless sensors disposed in the docking station and/or the electronic device. In other embodiments, a processor within the electronic device may be used to perform the analysis, while in further embodiments a portion of the contactless sensor data may be processed by the docking station while a portion of the contactless sensor data may be processed by the electronic device.

It will be appreciated that the method of commanding an electronic device using a sensor in a docking station described herein is illustrative that that variations and modifications are possible. For instance, in some embodiments a docking station may not be used and the vibration, optical and/or acoustic sensors within the portable electronic device may be used. For example, an electronic device may be disposed on a table and an activation event such as a wake up alarm may occur. A user may perform an impact event (knock) on the table. The vibration sensor within the electronic device may detect the impact and the processor within the electronic device may analyze the impact and determine that it is an input by a user desiring to silence the alarm for five minutes. The electronic device may then snooze the alarm for five minutes.

It is also appreciated that in some embodiments a vibration and or contactless sensor may only be incorporated in the docking station and all the processing may be performed in the electronic device. In further embodiments no sensors may be disposed in the docking station and an application on the electronic device may make the electronic device monitor for and respond to impact and/or contactless inputs from a user. For example, an application may make the electronic device remain in an on state when it is mated with the docking station so the electronic device sensors may continuously monitor for user impact inputs.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A portable electronic device that can be coupled to a charging device, the portable electronic device comprising:
   a housing;
   a charging device interface that allows the portable electronic device to be coupled to the charging device;
   charging circuitry configured to, when the portable electronic device is coupled to the charging device, receive electrical charge from the charging device through the charging device interface; and
   processing circuitry disposed within the housing and configured to:
   (i) activate a vibration analysis mode of the portable electronic device in response to receiving a signal from the charging device, and
   (ii) while in the vibration analysis mode, receive a vibration signal corresponding to a vibration of a surface supporting the portable electronic device and the charging device, analyze the vibration signal, determine an action based on the analysis of the vibration signal, and perform the action on the portable electronic device;
   wherein after receiving the signal from the charging device the processing circuitry delays a predetermined amount of time before activating the vibration analysis mode.

2. The portable electronic device of claim 1 wherein analyzing the vibration signal includes determining if the vibration signal is above a predetermined threshold value.

3. The portable electronic device of claim 1 wherein the portable electronic device is a wristwatch.

4. The portable electronic device of claim 1 wherein data gathered in a training mode is used to determine if the vibration signal corresponds to a user impact command.

5. A portable electronic device comprising:
   a housing;
   a vibration sensor configured to generate a vibration signal in response to a vibration of the portable electronic device;
   a processor disposed within the housing and operatively coupled to the vibration sensor, the processor configured to:
   detect an activation event;
   delay a predetermined amount of time after detecting the activation event and subsequently activate a vibration detection mode of the portable electronic device;
   receive, after the delay, a vibration signal from the vibration sensor;
   analyze the vibration signal;
   determine an action based on the analysis of the vibration signal; and
   perform the action on the portable electronic device.

6. The portable electronic device of claim 5 wherein after detecting the activation event and delaying the predetermined amount of time, the processor opens a time window in which it is able to receive the vibration signal.

7. The portable electronic device of claim 6 wherein the time window has a predetermined ending time.

8. The portable electronic device of claim 5 wherein analyzing the vibration signal includes determining if the vibration signal is above a predetermined threshold value.

9. The portable electronic device of claim 5 wherein the vibration sensor comprises an accelerometer.

10. The portable electronic device of claim 5 wherein the portable electronic device is a wristwatch.

11. The portable electronic device of claim 5 wherein data gathered in a training mode is used to determine if the vibration signal corresponds to a user impact command.

12. A method of communicating with a portable electronic device, the method comprising:
   placing the portable electronic device on a surface;
   detecting, by the portable electronic device, an activation event;
   delaying a predetermined amount of time after detecting the activation event and subsequently activating a vibration detection mode of the portable electronic device;
   communicating with the portable electronic device by causing the surface to vibrate;

sensing, by a vibration sensor within portable electronic device, a vibration signal corresponding to the vibration of the surface;
analyzing the vibration signal;
determining an action based on the analysis of the vibration signal; and
performing the action on the portable electronic device.

13. The method of claim 12 wherein analyzing the vibration signal includes determining if the vibration signal is above a predetermined threshold value.

14. The method of claim 12 wherein the vibration sensor comprises an accelerometer.

15. The method of claim 12 wherein the portable electronic device is a wristwatch.

16. The method of claim 12 further comprising gathering data in a training mode and using the data to determine if the vibration signal corresponds to a user impact command.

* * * * *